United States Patent
Kang et al.

(10) Patent No.: US 8,509,079 B2
(45) Date of Patent: Aug. 13, 2013

(54) APPARATUS AND METHOD FOR TRANSMITTING/RECEIVING SIGNAL IN SINGLE CARRIER FREQUENCY DIVISION MULTIPLEXING ACCESS COMMUNICATION SYSTEM

(75) Inventors: In-Tae Kang, Seongnam-si (KR); Jung-Hwa Bae, Suwon-si (KR); Bo-Rham Lee, Seoul (KR); Sang-Min Bae, Yongin-si (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 12/795,991

(22) Filed: Jun. 8, 2010

(65) Prior Publication Data

US 2010/0322065 A1 Dec. 23, 2010

(51) Int. Cl.
*H04J 3/14* (2006.01)

(52) U.S. Cl.
USPC ........................................... 370/235; 370/344

(58) Field of Classification Search
None
See application file for complete search history.

(56) References Cited

U.S. PATENT DOCUMENTS

| | | | | |
|---|---|---|---|---|
| 6,178,100 | B1* | 1/2001 | Kitano | 363/19 |
| 2007/0014272 | A1* | 1/2007 | Palanki et al. | 370/344 |
| 2008/0255830 | A1* | 10/2008 | Rosec et al. | 704/205 |
| 2011/0075651 | A1* | 3/2011 | Jia et al. | 370/344 |

\* cited by examiner

*Primary Examiner* — Andrew Lai
*Assistant Examiner* — Leon Andrews
(74) *Attorney, Agent, or Firm* — Jefferson IP Law, LLP (57) ABSTRACT

A method and apparatus for transmitting a signal whereby it is determined if a Bandwidth Expansion Factor (BEF) Q is an integer, the BEF being determined as N/M according to a number N of subcarriers of a system band and a number M of subcarriers of an allocated band, an input signal to be transmitted Q times in a time domain when the Q is an integer is expanded, a Single Carrier Frequency Division Multiplexing Access (SC-FDMA) signal is generated, and the SC-FDMA signal is transmitted.

22 Claims, 6 Drawing Sheets

APPARATUS AND METHOD FOR TRANSMITTING/RECEIVING SIGNAL IN SINGLE CARRIER FREQUENCY DIVISION MULTIPLEXING ACCESS COMMUNICATION SYSTEM

PRIORITY

This application claims the benefit under 35 U.S.C. §119 (a) of a Korean patent application filed in the Korean Intellectual Property Office on Jun. 19, 2009 and assigned Serial No. 10-2009-0054775, the entire disclosure of which is hereby incorporated by reference.

BACKGROUND OF THE INVENTION

1. Field of the Invention

The present invention relates to a signal transmitting/receiving apparatus and method in a Single Carrier-Frequency Division Multiplexing Access (SC-FDMA) communication system. More particularly, the present invention relates to a signal transmitting/receiving apparatus and method for reducing power consumption in an SC-FDMA communication system.

2. Description of the Related Art

A Single Carrier-Frequency Division Multiplexing Access (SC-FDMA) scheme is similar to an Orthogonal Frequency Division Multiplexing Access (OFDMA) scheme. However, the SC-FDMA scheme maintains single-carrier properties while using a multi-carrier, thereby lowering a Peak-to-Average Power Ratio (PAPR) which is a problem in the OFDMA scheme.

Unlike a data modulation method of the OFDMA scheme, the SC-FDMA scheme allocates data to a time domain, converts a signal allocated to the time domain into a signal in a frequency domain through the use of a Discrete Fourier Transform (DFT) module, and then performs signal processing with respect to the signal in the frequency domain, thereby generating one SC-FDMA symbol in a time domain. Therefore, a transceiver using the SC-FDMA scheme needs a DFT module, differently from a transceiver using the OFDMA scheme.

Figure 1:
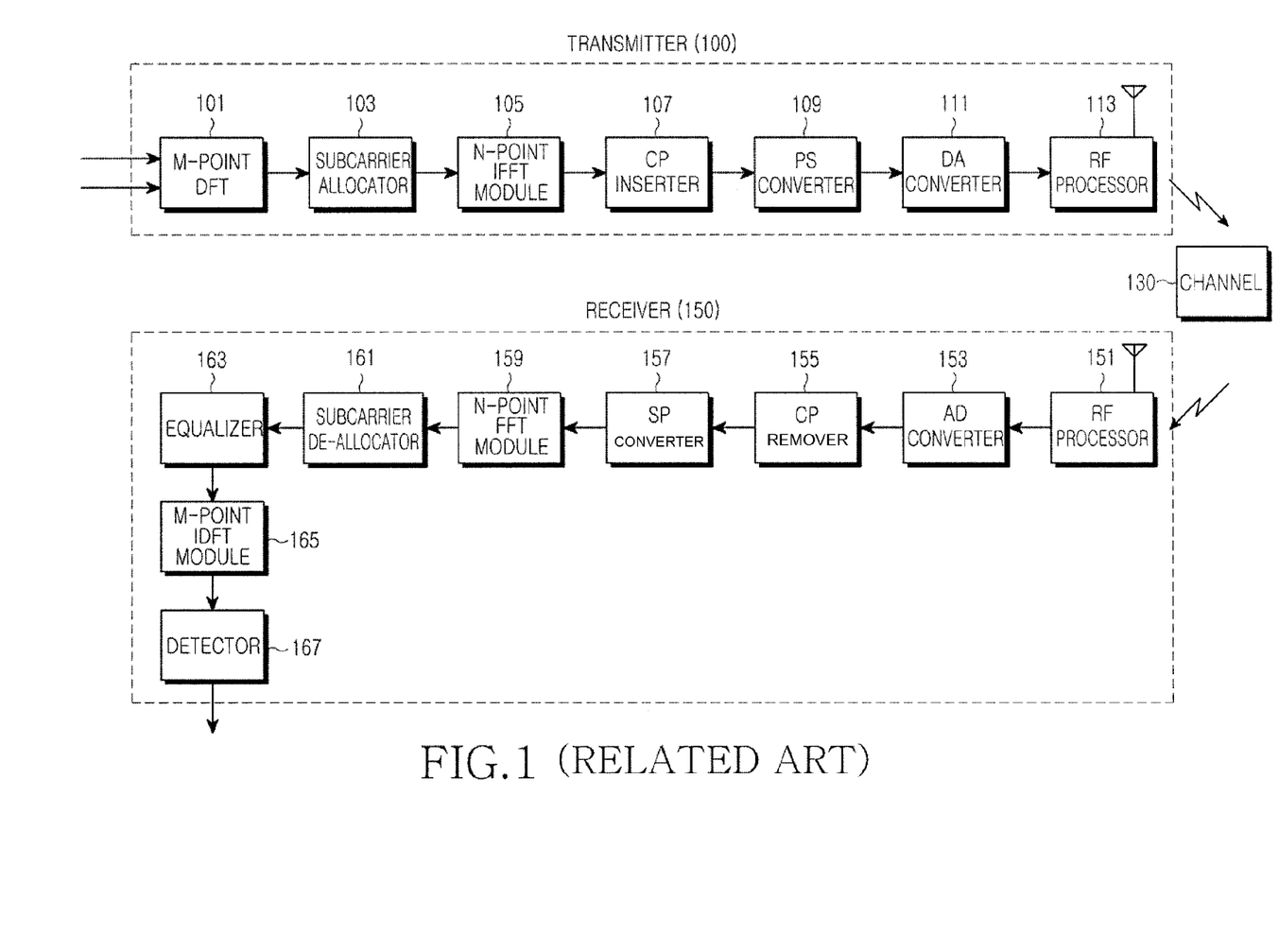
FIG. 1 is a block diagram illustrating a configuration of a related signal transmission/reception apparatus used in a Single Carrier-Frequency Division Multiplexing Access (SC-FDMA) communication system according to the related art.

FIG. 1 is a block diagram illustrating a configuration of a signal transmission/reception apparatus used in an SC-FDMA communication system according to the related art.

Referring to FIG. 1, a signal transmission apparatus 100 includes an M-point DFT module 101, a subcarrier allocator (or subcarrier mapper) 103, an N-point Inverse Fast Fourier Transform (IFFT) module 105, a Cyclic Prefix (CP) inserter 107, a Parallel-to-Serial (PS) converter 109, a Digital-to-Analog (DA) converter 111, and a Radio Frequency (RF) processor 113. A signal reception apparatus 150 includes an RF processor 151, an Analog-to-Digital (AD) converter 153, a CP remover 155, a Serial-to-Parallel (SP) converter 157, an N-point Fast Fourier Transform (FFT) module 159, a subcarrier de-allocator (or subcarrier de-mapper) 161, an equalizer 163, an M-point Inverse Discrete Fourier Transform (IDFT) module 165, and a detector 167.

First, a signal to be transmitted is generated in the signal transmission apparatus 100, the signal is input to the M-point DFT module 101. The M-point DFT module 101 converts the input signal in a time domain into a signal in a frequency domain, and outputs the signal in the frequency domain to the subcarrier allocator 103. The subcarrier allocator 103 receives the signal output from the M-point DFT module 101, maps the received signal to a frequency band to be transmitted, and outputs the mapped signal to the N-point IFFT module 105. The N-point IFFT module 105 receives the signal output from the subcarrier allocator 103, performs IFFT processing on the signal received from the subcarrier allocator 103, and outputs the IFFT-processed signal to the CP inserter 107. The CP inserter 107 inserts a CP into the signal output from the N-point IFFT module 105, and outputs the CP-inserted signal to the PS converter 109. The PS converter 109 receives a parallel signal output from the CP inserter 107, converts the parallel signal into a serial signal, and outputs the serial signal to the DA converter 111. The DA converter 111 receives a digital signal output from the PS converter 109, converts the digital signal into an analog signal, and outputs the analog signal to the RF processor 113. The RF processor 113 receives the signal output from the DA converter 111, performs an RF processing on the received signal, and outputs the RF-processed signal to the signal reception apparatus 150 through a channel 130.

The operation of the signal reception apparatus 150 for receiving a signal through the channel 130 will now be described. The RF processor 151 receives an RF signal through the channel 130, restores an original signal before the RF processing from the received RF signal, and outputs the restored signal to the AD converter 153. The AD converter 153 receives an analog signal output from the RF processor 151, converts the analog signal into a digital signal, and outputs the digital signal to the CP remover 155. The CP remover 155 removes the CP from the signal output from the AD converter 153, and outputs the CP-removed signal to the SP converter 157. The SP converter 157 receives a serial signal output from the CP remover 155, converts the serial signal into a parallel signal, and outputs the parallel signal to the N-point FFT module 159. The N-point FFT module 159 receives the signal output from the SP converter 157, performs FFT processing on the received signal, and outputs the FFT-processed signal to the subcarrier de-allocator 161. The subcarrier de-allocator 161 receives the signal output from the N-point FFT module 159, demaps the received signal to a signal in the frequency domain, and outputs the demapped signal to the equalizer 163. The equalizer 163 receives the signal output from the subcarrier de-allocator 161, compensates for signal distortion, and outputs the compensated signal to the M-point IDFT module 165. The M-point IDFT module 165 receives the signal in the frequency domain, which has been output from the equalizer 163, converts the signal in the frequency domain into a signal in the time domain, and outputs the signal in the time domain to the detector 167. The detector 167 receives the signal output from the M-point IDFT module 165, and detects a reception signal.

The DFT of the M-point DFT module 101 in the signal transmission apparatus 100 is defined by Equation 1 below:

$$X[k] = \sum_{n=0}^{M-1} x[n] W_M^{nk} \quad (1)$$

The IDFT of the M-point IDFT module 165 in the signal reception apparatus 150 is defined by Equation 2 below:

$$x[n] = \frac{1}{M} \sum_{n=0}^{M-1} X[k] W_M^{-nk} \quad (2)$$

Respective exponential values, which are multipliers in Equations 1 and 2, are referred to as twiddle factors. For example, the twiddle factor may be defined by Equation 3 below:

$$W_M = \exp(-j2\pi/M) \quad (3)$$

In Equation 3, "M" denotes the number of points in DFT or IDFT, and may be referred to as the size of DFT or IDFT.

Using a more efficient algorithm for the DFT calculation, the original DFT calculation may be implemented with a combination of smaller DFTs. Such algorithms are collectively designated as FFT. When the number of points in DFT is a power of 2 (i.e., $2^n$), the DFT and IDFT are implemented through the use of radix-2, radix-4, and split-radix algorithms in order to reduce the number of operations of actual hardware and to achieve a fast operation. In a case where DFT is performed on information with N number of input samples, when FFT with a pipeline structure is used, N*N number of complex multiplications is required. However, in this case, FFT in a butterfly structure is used, N/2*log N number of complex multiplications is required, so that it is possible to reduce the amount of calculation.

Meanwhile, in a Long Term Evolution (LTE) system, which represents the latest version of communication networks of the $3^{rd}$ Generation Partnership Project (3GPP) series, voice communication together with other data and multimedia communication is an important application due to characteristics of the 3GPP series. The LTE system is an Internet Protocol (IP)-based network, and provides voice communication service through a voice packet network using Voice-over-IP (VoIP).

In terms of an entire network, in order to efficiently configure VoIP, one cell must support a plurality of users. In this case, in order to maximize the system throughput, it is necessary to reduce overheads of control signals. To this end, a Semi-Persistent Scheduling (SPS) scheme which allows a resource allocated to one user to be continuously used is widely employed. The SPS scheme may reduce the overhead which is a problem in a dynamic scheduling scheme. In the case of the LTE system, since the amount of information of data of voice signals is not large, a base station allocates one Resource Block (RB) with a specific period to a mobile terminal through the use of the SPS scheme, and the mobile terminal transmits/receives signals through the use of the allocated resource block.

Also, the mobile terminal may be allocated RBs with different sizes depending on time or depending on Hybrid Automatic Repeat Request (HARQ) process IDentifications (IDs). In this case, the DFT of which the size, i.e., the number of points, changes depending on the size of an RB allocated to the mobile terminal, and the IFFT with a fixed size, because the IFFT is performed according to a system bandwidth, are continuously performed while the mobile terminal is transmitting high-speed data. However, when voice communication is continued during several minutes, it is unnecessary to continuously perform data modulation in a scheme for high-speed data communication, and such an unnecessary operation results in a waste of power.

The following description will be given on power consumed by each block with reference to the aforementioned signal transmission apparatus 100 of FIG. 1 as an example.

In an encoder (not illustrated), which may be positioned at an input end of the M-point DFT module 101, power consumption increases in proportion to the amount of data to be transmitted.

When the M-point DFT module 101 has a single butterfly structure, the M-point DFT module 101 must use faster clocks that are two times the number of stages than clocks used in a pipeline structure in order to output the same throughput as that output in the pipeline structure, thereby consuming relatively more time and power. In order to implement a scalable DFT, which the size is not fixed and the size changes to various scales, a hardware implementation scheme of arranging a plurality of 2-radix, 3-radix, and 5-radix butterfly structures in series according to a pipeline scheme is widely employed. In this case, depending on Transmission Time Intervals (TTIs) or depending on HARQ process IDs, DFTs having different sizes must be used for Adaptive Modulation and Coding (AMC). Accordingly, it is impossible to cut off power of a non-used butterfly structure for a long time, so that almost the same amount of power is consumed regardless of a bandwidth allocated to a mobile terminal or a system bandwidth.

The subcarrier allocator 103 may be implemented simply through address control upon hardware implementation, so that the subcarrier allocator 103 consumes little power.

In the N-point IFFT module 105, since the IFFT size, i.e., the number of points, of the N-point IFFT module 105 is determined according to a determined system bandwidth (e.g., the system bandwidth of 20 MHz results in 2048-point IFFT), power consumption is always constant in accordance with the maximum amount of data to be transmitted.

In the transmission filter, which includes the PS converter 109, the DA converter 111, and the RF processor 113, since power consumption results in proportion to a sampling rate which is determined based on a system bandwidth, additional optimization is impossible. However, since the number of clocks used for the operation of the transmission filter is less than the number of clocks used in the M-point DFT module 101 or N-point IFFT module 105, power consumption is less than the power consumption of the M-point DFT module 101 or N-point IFFT module 105.

That is, regardless of whether the amount of data to be transmitted is large or small, the M-point DFT module 101 and the N-point IFFT module 105 consume almost the same amount of power as the power consumed when the maximum amount of data is transmitted. When data to be transmitted is large, the power efficiency is hardly deteriorated. However, when data to be transmitted is small, the power efficiency is deteriorated, thereby significantly increasing a ratio of the power consumption of the M-point DFT module 101 and N-point IFFT module 105 to the power consumption of the entire system bandwidth.

Therefore, a need exists for an apparatus and method for reducing power consumption in a SC-FDMA communication system.

SUMMARY OF THE INVENTION

An aspect of the present invention is to address at least the above-mentioned problems and/or disadvantages and to provide at least the advantages described below. Accordingly, an aspect of the present invention is to provide a signal transmitting/receiving apparatus for reducing power consumption in a Single Carrier-Frequency Division Multiplexing Access (SC-FDMA) communication system, and a method for supporting the apparatus.

Another aspect of the present invention is to provide an apparatus for transmitting/receiving a signal through either an existing path including a Discrete Fourier Transform (DFT) module and an Inverse Fast Fourier Transform (IFFT) module or a new path not including a DFT module and an IFFT module according to preset conditions in an SC-FDMA communication system, and a method for supporting the apparatus.

In accordance with an aspect of the present invention, an apparatus for transmitting a signal in an SC-FDMA communication system is provided. The apparatus includes a controller for determining if a Bandwidth Expansion Factor (BEF) Q is an integer, the BEF being determined as N/M according to a number N of subcarriers of a system band and a number M of subcarriers of an allocated band, and a multiplier for generating an SC-FDMA signal through use of an input signal to be transmitted, which is expanded Q times in a time domain, when the Q is an integer.

In accordance with another aspect of the present invention, a method for transmitting a signal in an SC-FDMA communication system is provided. The method includes determining if a BEF Q is an integer, the BEF being determined as N/M according to a number N of subcarriers of a system band and a number M of subcarriers of an allocated band, expanding an input signal to be transmitted Q times in a time domain when the Q is an integer, generating an SC-FDMA signal, and transmitting the SC-FDMA signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for transmitting/receiving a signal through either an existing path including a Discrete Fourier Transform (DFT) module and an Inverse Fast Fourier Transform (IFFT) module or a new path not including a DFT module and an IFFT module according to a preset condition in a Single Carrier-Frequency Division Multiplexing Access (SC-FDMA) communication system which uses a signal transmission/reception apparatus.

A description will be given below on the preset condition, which is used to select either the existing path or the new path to transmit/receive a signal in the SC-FDMA communication system using a signal transmission/reception apparatus proposed by the present invention.

In the following description, an exemplary embodiment of the present invention provides an SC-FDMA communication system as an example, and more particularly, an apparatus and method for transmitting/receiving a signal through either an existing path or a new path in an SC-FDMA communication system using a $3^{rd}$ Generation Partnership Project (3GPP) Long Term Evolution LTE standard, for convenience of description. However, the apparatus and method for transmitting/receiving a signal through either an existing path or a new path may be applied to all types of SC-FDMA communication systems.

In an SC-FDMA communication system, multiplexing of multiple users for multi-user access is performed in a Frequency Division Multiplexing Access (FDMA) scheme in a frequency band, and generally, a bandwidth allocated to one user corresponds to a part of the entire system bandwidth. Therefore, an M-point DFT and an N-point IFFT always maintain a relationship of "$M \leq N$" between each other, wherein "N/M" is defined as a Bandwidth Expansion Factor (BEF), which has a value of an integer or a rational number other than the integer. For example, when a system bandwidth is 20 MHz in an LTE system, a mobile terminal may use a maximum resource of 100 RB. In this case, when it is assumed that a bandwidth of 1 RB, 2 RB, or 3 RB is allocated to the mobile terminal, the BEF becomes 100, 50, or 100/3, respectively.

In the SC-FDMA communication system, subcarrier allocation schemes used to lower a Peak-to-Average Power Ratio (PAPR) include an Interleaved FDMA scheme (IFDMA) and Localized FDMA (LFDMA) scheme. In the system, subcarriers are allocated to each mobile terminal in the IFDMA scheme or LFDMA scheme according to preset rules.

Figure 2A:
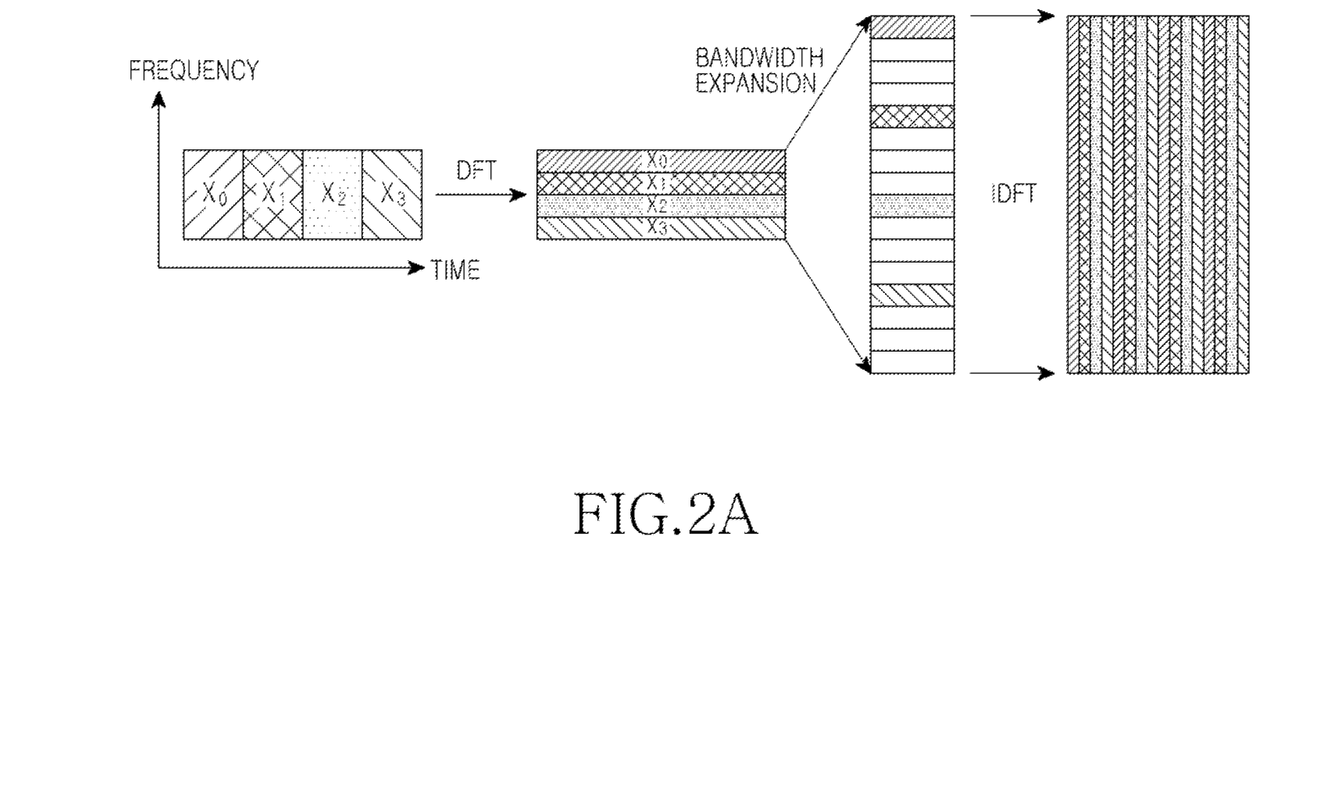
FIG. 2A is a view illustrating a case where subcarriers are allocated in an Interleaved Frequency Division Multiplexing Access (IFDMA) scheme in an SC-FDMA communication system according to an exemplary embodiment of the present invention.
Figure 2B:
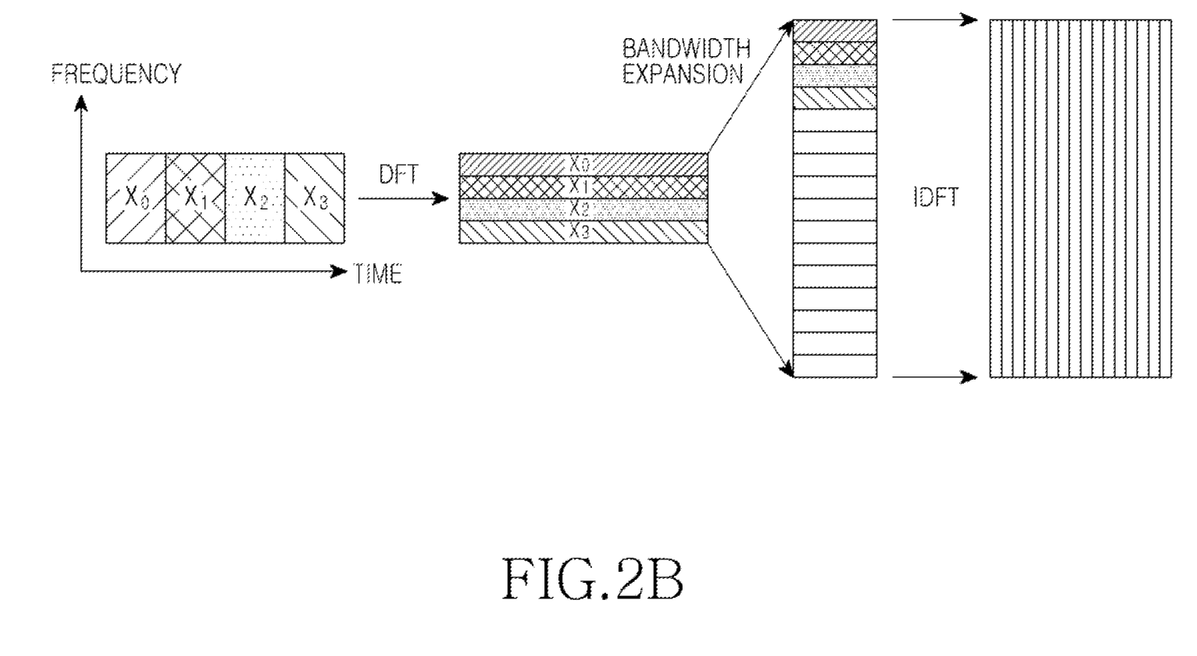
FIG. 2B is a view illustrating a case where subcarriers are allocated in a Localized Frequency Division Multiplexing Access (LFDMA) scheme in an SC-FDMA communication system according to an exemplary embodiment of the present invention.

FIG. 2A is a view illustrating a case where subcarriers are allocated in an IFDMA scheme in an SC-FDMA communication system according to an exemplary embodiment of the present invention, and FIG. 2B is a view illustrating a case where subcarriers are allocated in an LFDMA scheme in an SC-FDMA communication system according to an exemplary embodiment of the present invention.

For convenience of description, it is assumed that an allocated bandwidth is 4 subcarriers and the entire system bandwidth is 16 subcarriers. Accordingly, a 4-point DFT is performed and the BEF becomes "16/4=4."

Referring to FIG. 2A, an operation of allocating subcarriers in the IFDMA scheme in the SC-FDMA communication system will now be described. Four complex symbols $\{x_0, x_1, x_2, x_3\}$ in the time domain are converted into complex symbols $\{X_0, X_1, X_2, X_3\}$ in the frequency domain through DFT. The complex symbols $\{X_0, X_1, X_2, X_3\}$ are uniformly spread and allocated in the frequency domain in such a manner as to allocate one complex symbol per value of a BEF, that is, one complex symbol per 4 subcarriers, and the other subcarriers to which the complex symbols $\{X_0, X_1, X_2, X_3\}$ have not been allocated are filled with "0." The complex symbols spread and allocated in the frequency domain are converted into complex symbols in the time domain through IDFT.

Referring to FIG. 2B, an operation of allocating subcarriers in the LFDMA scheme in the SC-FDMA communication system will now be described. Four complex symbols $\{x_0, x_1, x_2, x_3\}$ in the time domain are converted into complex symbols $\{X_0, X_1, X_2, X_3\}$ in the frequency domain through DFT. The complex symbols $\{X_0, X_1, X_2, X_3\}$ are allocated to continuous subcarriers, and a process, i.e., a zero padding process, of padding zero to the other subcarriers to which the complex symbols $\{X_0, X_1, X_2, X_3\}$ have not been allocated is performed. The complex symbols allocated to continuous subcarriers in the frequency domain are converted into complex symbols in the time domain through IDFT.

As described above, the SC-FDMA communication system, more specifically the signal transmission apparatus according to an exemplary embodiment of the present invention, allocates subcarriers in the IFDMA scheme or the LFDMA scheme when the BEF is an integer, while allocating subcarriers in a general Distributed FDMA (DFDMA) scheme when the BEF is a rational number other than an integer.

Figure 3:
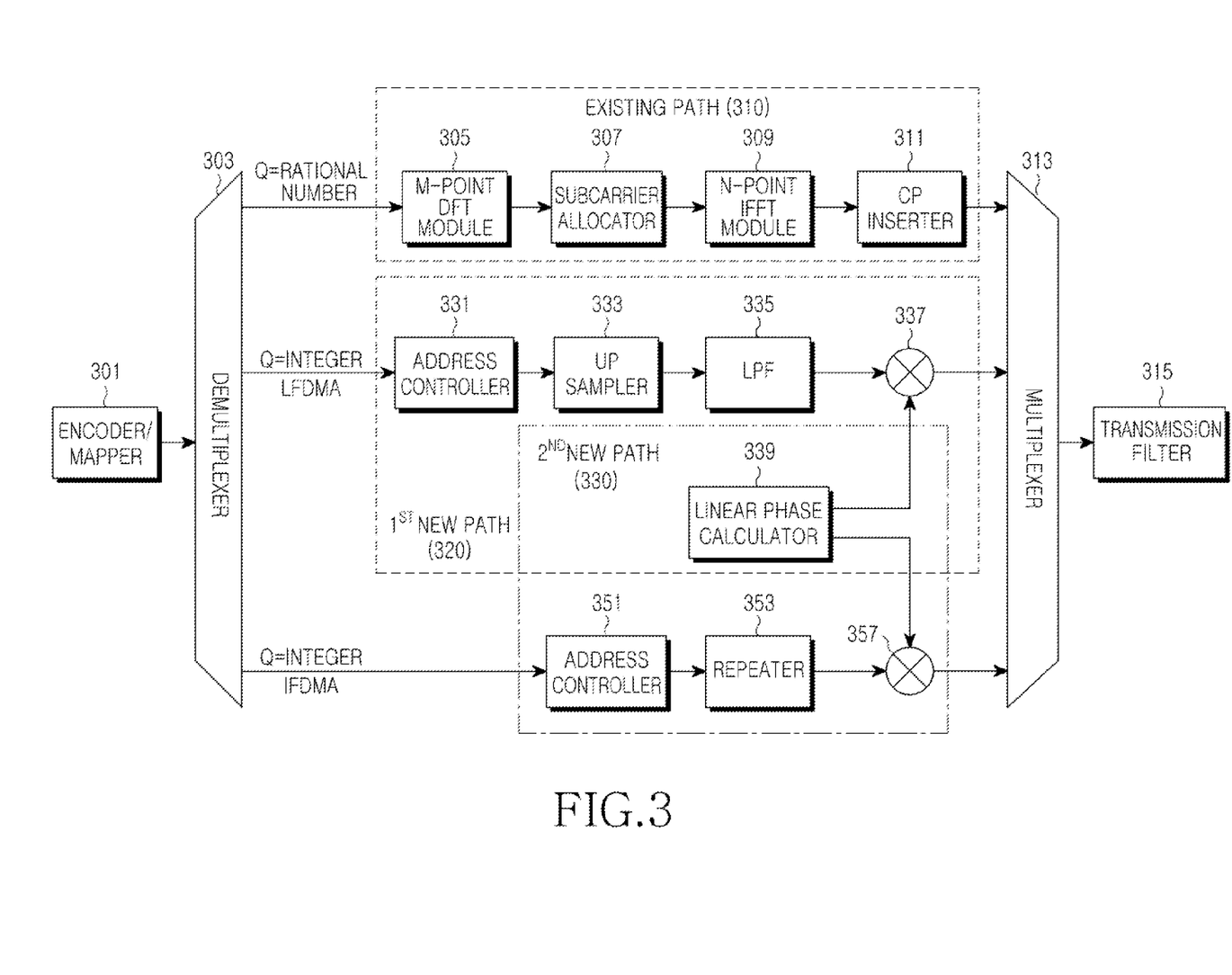
FIG. 3 is a block diagram illustrating a configuration of a signal transmission apparatus used in an SC-FDMA communication system according to an exemplary embodiment of the present invention.

FIG. 3 is a block diagram illustrating a configuration of a signal transmission apparatus used in an SC-FDMA communication system according to an exemplary embodiment of the present invention. An operation of the signal transmission apparatus will now be described in a case where resources constituted by M subcarriers among an entire system band constituted by N subcarriers are allocated.

Referring to FIG. 3, the signal transmission apparatus includes an encoder/mapper 301, a demultiplexer 303, an existing path 310, a first new path 320, a second new path 330, a multiplexer 313, and a transmission filter 315. The existing path 310 includes an M-point DFT module 305, a subcarrier allocator 307, an N-point IFFT module 309, and a Cyclic Prefix (CP) inserter 311. The first new path 320 includes an address controller 331, an upsampler 333, a Low Pass Filter (LPF) 335, a multiplier 337, and a linear phase calculator 339. The second new path 330 includes an address controller 351, a repeater 353, a multiplier 357, and the linear phase calculator 339.

The transmission apparatus illustrated in FIG. 3 may additionally include a BEF calculator (not illustrated) for determined a BEF, and a power controller (not illustrated) for supplying power to one of the existing path 310, the first new path 320, and the second new path 330 according to the value of the determined BEF.

The first new path 320 and second new path 330 are used only when the value of a BEF calculated by the BEF calculator is an integer, and the existing path 310 is used to transmit/receive signals when the value of a BEF determined by the BEF calculator is a rational number other than an integer. The operation of transmitting signals through the existing path 310 is the same as the operation of the signal transmission apparatus, described with reference to FIG. 1. Therefore, a detailed description thereof will be omitted.

Also, when the value of a BEF determined by the BEF calculator is an integer, the power controller cuts off the power supply to the existing path 310, and supplies power to the first new path 320 or the second new path 330. In contrast, when the value of a BEF determined by the BEF calculator is a rational number other than an integer, the power controller cuts off the power supply to the first new path 320 or the second new path 330, and supplies power to the existing path 310.

The first new path 320 is used when subcarriers are allocated in the LFDMA scheme, and the second new path 330 is used when subcarriers are allocated in the IFDMA scheme.

The encoder/mapper 301 outputs a signal to be transmitted to the demultiplexer 303, and the demultiplexer 303 selects a path, through which the signal to be transmitted is to pass, according to a determination result by the BEF calculator. In a case where the determined BEF value, that is, "N/M," is assumed to be Q, when Q is an integer, the demultiplexer 303 outputs the signal to be transmitted to the first new path 320 or to the second new path 330 according to whether the LFDMA or the IFDMA is used. That is, when Q is an integer, the DFT and IFFT processes for signal conversion in the frequency domain may be replaced by an operation of expanding an input signal Q times in the time domain, as described below. Therefore, the existing DFT and IFFT processes, which consume preset power regardless of the amount of data to be transmitted, may be selectively removed in a signal transmission procedure, so that it is possible to significantly reduce power consumption.

The following description will be given on a method for, when Q is an integer, generating and transmitting an SC-FDMA signal through a process of expanding the input signal Q times in the time domain according to an exemplary embodiment of the present invention. More specifically, the process of expanding the input signal Q times in the time domain is implemented by a Q-times upsampling process when the LFDMA is used or by a Q-times repetition process when the IFDMA is used.

When the LFDMA scheme is used, and thus the demultiplexer 303 outputs the signal to be transmitted to the first new path 320, the address controller 331 controls the address of the signal output from the demultiplexer 303, inserts a CP, and outputs the CP-inserted signal to the upsampler 333, which correspond to the operation of the CP inserter 311. The upsampler 333 receives the signal output from the address controller 331, Q-times upsamples the received signal, and outputs the upsampled signal to the LPF 335, which correspond to the operations of the M-point DFT module 305 and N-point IFFT module 309. Here, the term "upsampling" denotes inserting "Q−1" number of zeros between every two samples. The LPF 335 receives the signal output from the upsampler 333, allows only a signal of a corresponding band to pass, and outputs the signal of the corresponding band to the multiplier 337. The multiplier 337 multiplies the signal output from the LPF 335 by a signal output from the linear phase calculator 339 to shift the signal output from the LPF 335 according to a start offset of an allocated resource, and outputs the shifted signal to the multiplexer 313.

Meanwhile, when the IFDMA scheme is used, and thus the demultiplexer 303 outputs a signal to the second new path 330, the address controller 351 controls the address of the signal output from the demultiplexer 303, inserts a CP, and outputs the CP-inserted signal to the repeater 353, which correspond to the operation of the CP inserter 311. The repeater 353 receives the signal output from the address controller 351, repeats the received signal Q times, and outputs the repeated signal to the multiplier 357, which correspond to the operations of the M-point DFT module 305 and N-point IFFT module 309. The multiplier 357 multiplies the signal output from the repeater 353 by a signal output from the linear phase calculator 339 to shift the signal output from the repeater 353, and outputs the shifted signal to the multiplexer 313.

Figure 4:
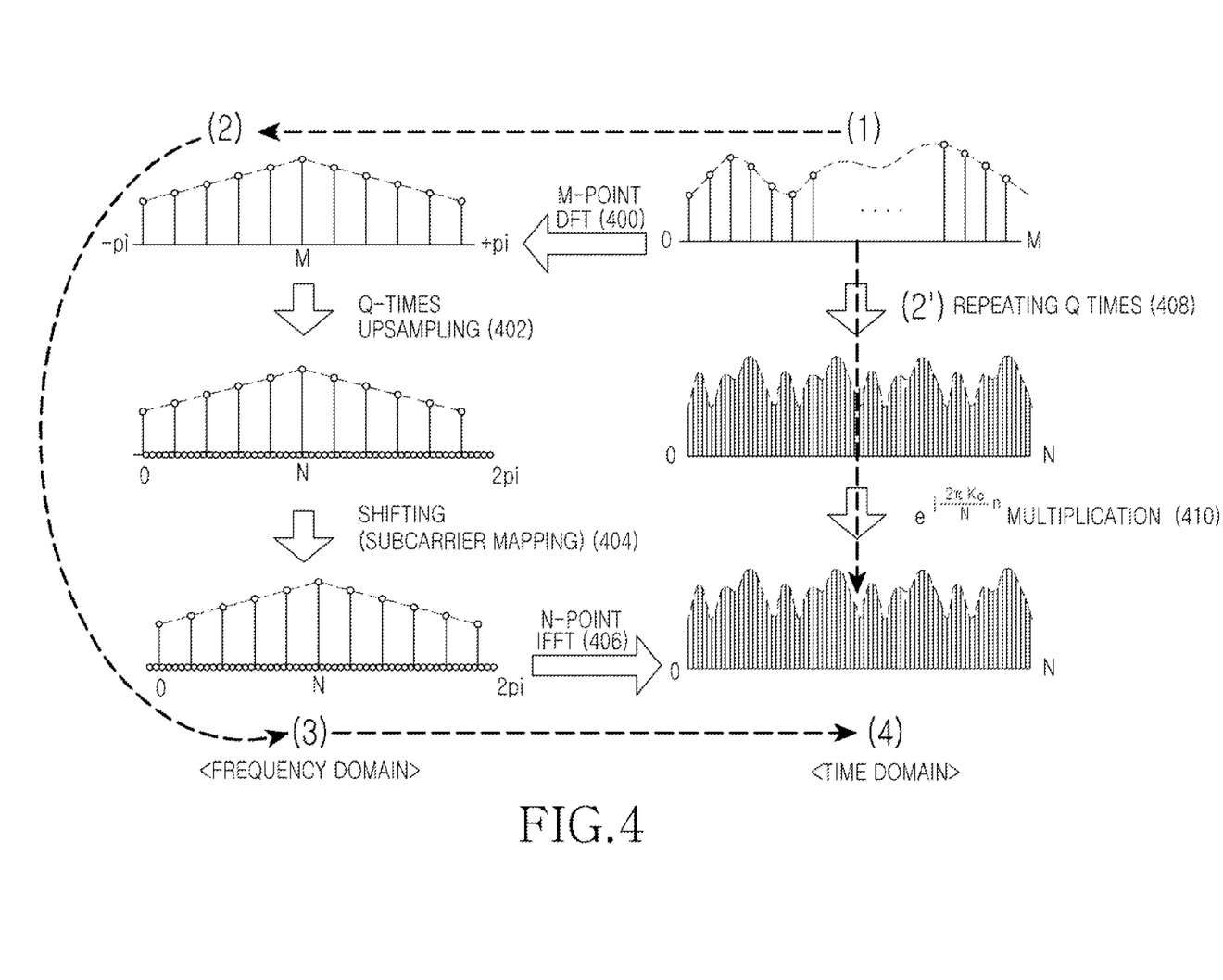
FIG. 4 is a view illustrating signal processing with distinction between a frequency domain and a time domain when a signal transmission apparatus is used in an SC-FDMA communication system according to an exemplary embodiment of the present invention.

FIG. 4 is a view illustrating signal processing with distinction between a frequency domain and a time domain when a signal transmission apparatus is used in an SC-FDMA communication system according to an exemplary embodiment of the present invention. The signal processing will be described based on the operation of a second new path 330 used when an IFDMA scheme is applied.

Referring to FIG. 4, it can be understood that a signal passing through an existing path 310 is processed in the order of reference numerals 1, 2, 3, and 4, and a signal passing through a second new path 330 is processed in the order of reference numerals 1, 2', and 4.

That is, the signal processing through the existing path 310 includes converting signal 1 in the time domain into signal 2 in the frequency domain through M-point DFT in step 400, mapping the converted signal to subcarriers in the frequency domain, as illustrated in signal 3, by performing Q-times upsampling and shifting processes on the converted signal in steps 402 and 404, respectively, and performing N-point IFFT to transform signal 3 in the frequency domain into signal 4 in the time domain in step 406.

In contrast, the signal processing through the second new path 330 is performed only in the time domain, and includes repeating an input signal 1 Q times in step 408, and multiplying the repeated signal by a linear phase value $$e^{j\frac{2\pi k_0}{N}n}$$

based on a start offset $k_0$ of the allocated resource in step 410, thereby generating a signal 4 in the time domain. Here, the linear phase value denotes a signal output from the linear phase calculator 339, "N" denotes the number of subcarriers in the system band, and "n" denotes a time index.

As described above, it can be understood that, although signals output through the two paths, i.e., the existing path 310 and the second new path 330, are the same, the signal processing through the second new path 330 is simpler than the signal processing through the existing path 310.

The shifting in the frequency domain in step 404 is defined as Equation 4 below, which is equal to the operation of multiplying the repeated signal by the linear phase value in the time domain in step 410.

$$X[k-k_0] = \sum_{n=0}^{N-1} x[n] e^{-j\frac{2\pi(k-k_0)}{N}n} \quad (4)$$

$$= \sum_{n=0}^{N-1} \left\{ e^{j\frac{2\pi k_0}{N}n} x[n] \right\} e^{-j\frac{2\pi k}{N}n}$$

$$X[k-k_0] \xleftrightarrow{DFT} e^{j\frac{2\pi k_0}{N}n} x[n]$$

where "x[n] (wherein, n=0, . . . , M−1)" represents a modulation symbol for Quadrature Phase Shift Keying (QPSK), 16 Quadrature Amplitude Modulation (16 QAM), and 64 QAM, and is a signal with a length of M in the time domain. A symbol in the frequency domain, which is obtained by converting a modulation symbol x[n] into a symbol X[k] (wherein, k=0, . . . , M−1) in the frequency domain through the M-point DFT and then performing an upsampling or zero-padding process on the symbol X[k], is defined as Y[k] (wherein, k=0, . . . , N−1). Here, N=M*Q is satisfied. In addition, a signal in the time domain, which is obtained by performing the N-point IFFT on the symbol Y[k], is defined as y[n] (wherein, n=0, . . . , N−1).

The upsampling in the frequency domain in step 402 changing the signal X[k] (wherein, k=0, . . . , M−1) to the Y[k] (wherein, k=0, . . . , N−1) defined by Equation 5 below, wherein N=M*Q is satisfied.

$$Y[k] = \begin{cases} X\left[\frac{k}{Q}\right], & \text{if } \frac{k}{Q} = \text{integer} \\ 0 & \text{otherwise} \end{cases} \quad (5)$$

$$y[n] = \sum_{k=0}^{N-1} Y[k] e^{-j\frac{2\pi n}{N}k}$$

$$= \sum_{m=0}^{M-1} X[m] e^{-j\frac{2\pi n Q}{N}m}$$

$$= \sum_{m=0}^{M-1} X[m] e^{-j\frac{2\pi n}{M}m}$$

$$= x[n \bmod M]$$

for $n = 0, \ldots, N-1$
where $M \leq N$

According to Equation 5, a signal upsampled in the frequency domain satisfies y[n]=x[n mod M], which functions to repeat a signal x[n] with a length of M Q times in the time domain. That is, in a case of allocating subcarriers in the IFDMA scheme, when an input signal is repeated Q times and then multiplied by $$e^{j\frac{2\pi k_0}{N}n}$$

in the time domain according to the order of reference numerals 1, 2', and 4 for processing the input signal through the second new path 330, it is possible to output the same signal as the signal output when the input signal has been processed according to the order of reference numerals 1, 2, 3, and 4 for processing the input signal through the existing path 310. In Equation 5, y[n] denotes the output signal 4.

As described above, while the second new path 330 and the existing path 310 output the same signal y[n] as final signals, power consumption in the signal processing through the second new path 330 results only from multiplying a repeated signal by $$e^{j\frac{2\pi k_0}{N}n}$$

in step 410, that is, only in the multiplier 357. Therefore, the signal processing method through the second new path 330 may significantly reduce power consumption as compared with the signal processing method through the existing path 310.

Figure 5:
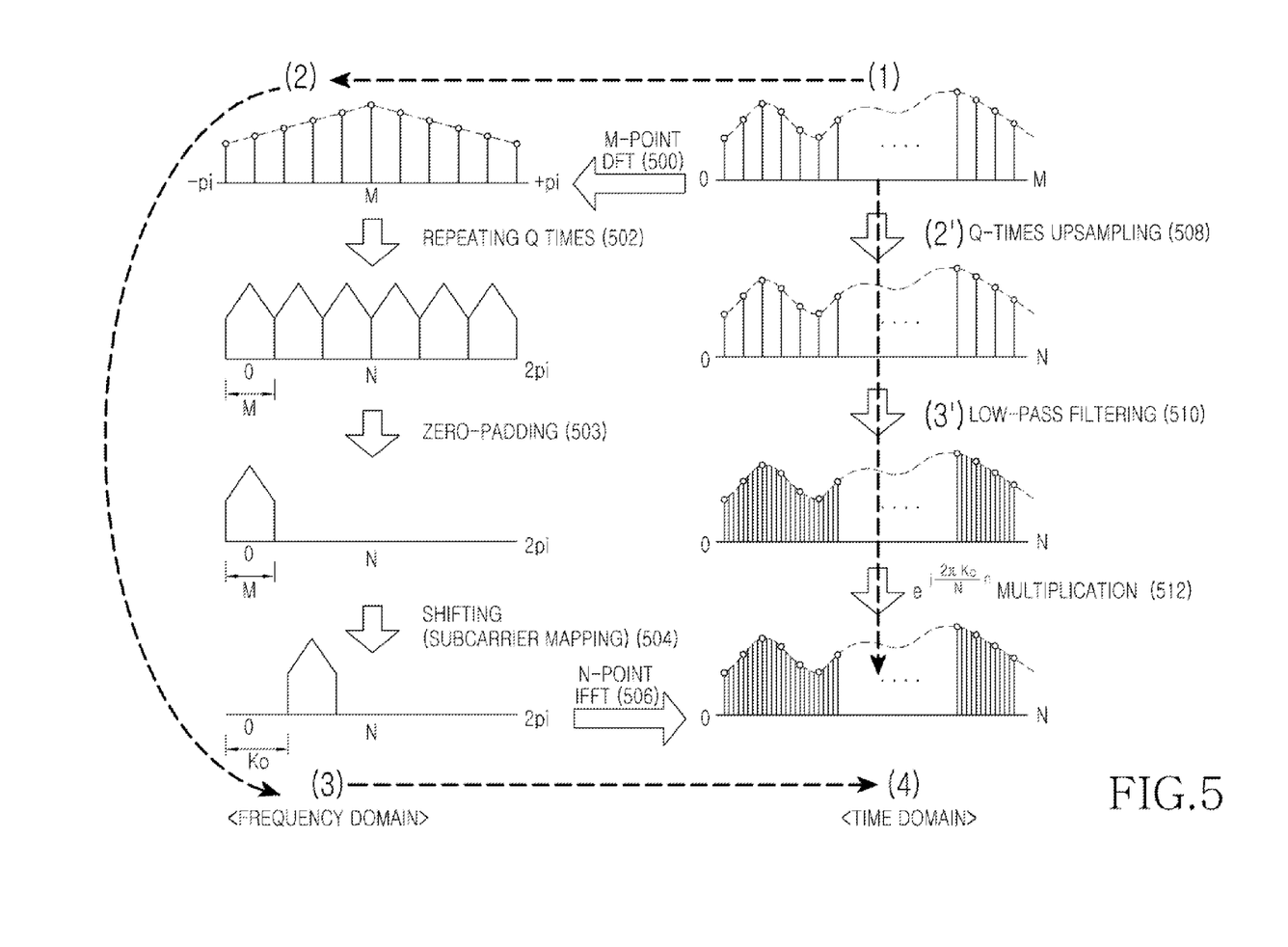
FIG. 5 is a view illustrating signal processing with distinction between a frequency domain and a time domain when a signal transmission apparatus is used in an SC-FDMA communication system according to an exemplary embodiment of the present invention.

FIG. 5 is a view illustrating signal processing with distinction between a frequency domain and a time domain when a signal transmission apparatus is used in an SC-FDMA communication system according to an exemplary embodiment of the present invention. The signal processing will be described below in more detail based on the operation of a first new path 320 used when an LFDMA scheme is applied.

Referring to FIG. 5, it can be understood that a signal passing through an existing path 310 is processed in the order of reference numerals 1, 2, 3, and 4, and a signal passing through a first new path 320 is processed in the order of reference numerals 1, 2', 3' and 4.

That is, the signal processing through the existing path 310 includes converting signal 1 in the time domain into signal 2 in the frequency domain through M-point DFT in step 500, mapping the converted signal to subcarriers in the frequency domain, as illustrated in signal 3, by performing Q-times repeating, zero-padding, and shifting processes on the converted signal in steps 502, 503, and 504, respectively, and performing N-point IFFT to transform signal 3 in the frequency domain into signal 4 in the time domain in step 506.

In contrast, the signal processing through the first new path 320 is performed only in the time domain, and includes Q-times upsampling the input signal 1 in step 508, performing a low-pass filtering operation on the upsampled signal in step 510, and multiplying the filtered signal by a linear phase value $$e^{j\frac{2\pi k_0}{N}n}$$

based on a start offset $k_0$ of the allocated resource in step 512, thereby generating signal 4 in the time domain.

As described above, it can be understood that, although signals output through the two paths, i.e., the existing path 310 and the first new path 320, are the same, the signal processing through the first new path 320 is simpler than the signal processing through the existing path 310.

The shifting in the frequency domain in step 504 is defined as Equation 4 described above, which is equal to the operation of multiplying the filtered signal by the linear phase value in the time domain in step 512.

The zero-padding in the frequency domain in step 503 denotes changing the signal X[k] (wherein, k=0, ..., M−1) to the Y[k] (wherein, k=0, ..., N−1) defined by Equation 6 below, wherein N≧M is satisfied.

$$Y[k] = \begin{cases} X[k], & \text{if } k = 0, \ldots, M-1 \\ 0 & \text{if } k = M, \ldots, N-1 \end{cases} \quad (6)$$

$$y[n] = \sum_{k=0}^{N-1} Y[k] e^{j\frac{2\pi n}{N}k}$$

$$= \sum_{m=0}^{M-1} X[m] e^{j\frac{2\pi n}{N}m}$$

$$= x\left(e^{j\frac{2\pi n}{N}}\right)$$

for $n = 0, \ldots, N-1$
where $M \leq N$

In a case of allocating subcarriers in the LFDMA scheme, when an input signal is Q-times upsampled, the input signal is subjected to low-pass filtering, and then multiplied by $$e^{j\frac{2\pi k_0}{N}n}$$

in the time domain according to the order of reference numerals 1, 2', 3', and 4 for processing the input signal through the first new path 320. Accordingly, it is possible to output the same signal as the signal output when the input signal has been processed according to the order of reference numerals 1, 2, 3, and 4 for processing the input signal through the existing path 310. In Equation 6, y[n] represents the output signal 4.

As described above, while the first new path 320 and the existing path 310 output the same signal y[n] as final signals, power consumption in the signal processing through the first new path 320 results only from performing a low-pass filtering operation in step 510, i.e., in the LPF 335, and multiplying the low-pass filtered signal by $$e^{j\frac{2\pi k_0}{N}n}$$

in step 512, i.e., in the multiplier 337. Therefore, the signal processing method through the first new path 320 may significantly reduce power consumption as compared with the signal processing method through the existing path 310.

Table 1 below shows estimated values of gate counts and chip sizes with respect to each block of the existing path and a block added according to an exemplary embodiment of the present invention.

TABLE 1

|  | Gate Count | Chip Size |
| --- | --- | --- |
| DFT module | 298K | 429K |
| Subcarrier Allocator | 6K | 9K |
| IFFT module | 93K | 134K |
| Memory (DFT module + Subcarrier Allocator + IFFT module + CP + etc.) | 768/3K | 1585/3K |
| Block added according to the present invention | Less than 20K | Less than 30K |

As shown in Table 1, when a total sum of chip sizes of the existing path is 429K+9K+134K+1585/3K=1100K, the chip size of a block added according to an exemplary embodiment of the present invention is estimated to be approximately 30K. Therefore, if only approximately 3% more hardware is added to that for the existing path, a transmission signal may be generated with only approximately 3 to 5% of the power consumption caused in the existing path when the BEF is an integer. Accordingly, the signal processing apparatus and method according to exemplary embodiments of the present invention is applied to a voice communication service, and the like, provided through Voice-over-Internet Protocol (VoIP). Accordingly, it is possible to reduce power consumption of the system up to 3 to 5% of the power consumption caused in the existing path.

Also, when a path, i.e., the first new path 320 or the second new path 330, is used, a processing delay is shortened, so that a larger timing margin for generating/transmitting an ACKnowledgment/Negative ACKnowledgment (ACK/NACK) signal for downlink Hybrid Automatic Repeat Request (HARQ) can be secured. For example, in a worst case where signals are received at a peak data rate within a cell radius of 100 km, it is possible to secure a sufficient timing margin.

According to exemplary embodiments of the present invention, when subcarriers are allocated in the an LFDMA scheme or an IFDMA scheme in an SC-FDMA communication system, and a BEF has a value of an integer, transmitting signals through a new path enables power consumption to be significantly reduced as compared with that of the related art.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a signal of a transmitter in a Single Carrier-Frequency Division Multiplexing Access (SC-FDMA) communication system, the method comprising:
    determining if a Bandwidth Expansion Factor (BEF) Q is an integer, the BEF being determined as N/M according to a number N of subcarriers of a system band and a number M of subcarriers of an allocated band;
    expanding Q times, in a time domain, an input signal to be transmitted, when the Q is the integer;
    generating an SC-FDMA signal; and
    transmitting the SC-FDMA signal.

2. The method as claimed in claim 1, wherein the allocated band is configured according to a Localized FDMA (LFDMA) scheme,
    wherein the expanding of the input signal Q times comprises a first step of Q-times upsampling the input signal, and a second step of low-pass filtering the upsampled signal,
    wherein the upsampling comprises inserting Q−1 zeros between every two samples, and
    wherein the generating of the SC-FDMA signal comprises a third step of generating the SC-FDMA signal by multiplying the low-pass filtered signal by a linear phase according to a start offset of the allocated band.

3. The method as claimed in claim 2, further comprising, before the upsampling of the input signal, controlling an address of the input signal to be transmitted and inserting a Cyclic Prefix (CP).

4. The method as claimed in claim 2, wherein the linear phase is determined by:

$$e^{j\frac{2\pi k_0}{N}n},$$

where "$k_0$" denotes the start offset of the allocated band, "N" denotes the number of subcarriers of the system band, and "n" denotes a time index.

5. The method as claimed in claim 2, further comprising:
    a fourth step of performing a Discrete Fourier Transform (DFT) processing on the input signal to be transmitted when the Q is not an integer;
    a fifth step of allocating the DFT-processed signal to the subcarriers of the allocated band; and
    a sixth step of performing an Inverse Fast Fourier Transform (IFFT) processing on the signal allocated to the subcarriers and generating the SC-FDMA signal.

6. The method as claimed in claim 5, further comprising supplying power to a first path including the first to third steps and cutting off power supply to a second path including the fourth to sixth steps when the Q is an integer, and supplying power to the second path and cutting off power supply to the first path when the Q is not an integer.

7. The method as claimed in claim 1, wherein the allocated band is configured according to an Interleaved FDMA (IFDMA) scheme,
    wherein the expanding of the input signal Q times comprises a first step of repeating the input signal Q times, and
    wherein the generating of the SC-FDMA signal comprises a second step of generating the SC-FDMA signal by multiplying the repeated signal by a linear phase according to a start offset of the allocated band.

8. The method as claimed in claim 7, further comprising, before the repeating of the input signal, controlling an address of the input signal to be transmitted and inserting a Cyclic Prefix (CP).

9. The method as claimed in claim 7, wherein the linear phase is determined by:

$$e^{j\frac{2\pi k_0}{N}n},$$

where "$k_0$" denotes the start offset of the allocated band, "N" denotes the number of subcarriers of the system band, and "n" denotes a time index.

10. The method as claimed in claim 7, further comprising:
    a third step of performing a Discrete Fourier Transform (DFT) processing on the input signal to be transmitted when the Q is not an integer;
    a fourth step of allocating the DFT-processed signal to the subcarriers of the allocated band; and
    a fifth step of performing an Inverse Fast Fourier Transform (IFFT) processing on the signal allocated to the subcarriers and generating the SC-FDMA signal.

11. The method as claimed in claim 10, further comprising supplying power to a first path including the first to second steps and cutting off power supply to a second path including the third to fifth steps when the Q is an integer, and supplying power to the second path and cutting off power supply to the first path when the Q is not an integer.

12. An apparatus for transmitting a signal in a Single Carrier-Frequency Division Multiplexing Access (SC-FDMA) communication system, the apparatus comprising:

a controller for determining if a Bandwidth Expansion Factor (BEF) Q is an integer, the BEF being determined as N/M according to a number N of subcarriers of a system band and a number NM of subcarriers of an allocated band; and a multiplier for generating an SC-FDMA signal through use of an input signal to be transmitted, which is expanded Q times in a time domain, when the Q is the integer.

13. The apparatus as claimed in claim 12, wherein the allocated band comprises a resource configured according to a Localized FDMA (LFDMA) scheme, and further comprising:

an upsampler for Q-times upsampling the input signal to expand the input signal Q times, wherein the upsampling comprises inserting Q−1 zeros between every two samples; and a Low Pass Filter (LPF) for low-pass filtering the upsampled signal, wherein the multiplier multiplies the low-pass filtered signal by a linear phase according to a start offset of the allocated band and generates the SC-FDMA signal.

14. The apparatus as claimed in claim 13, further comprising an address controller for controlling an address of the input signal to be transmitted and inserting a Cyclic Prefix (CP) before the upsampling is performed.

15. The apparatus as claimed in claim 13, further comprising a linear phase calculator for determining the linear phase, wherein the linear phase is determined by:

$$e^{j\frac{2\pi k_0}{N}n},$$

where "$k_0$" denotes the start offset of the allocated band, "N" denotes the number of subcarriers of the system band, and "n" denotes a time index.

16. The apparatus as claimed in claim 13, further comprising:

a Discrete Fourier Transform (DFT) module for performing a DFT processing on the input signal to be transmitted when the Q is not an integer;

a subcarrier allocator for allocating the DFT-processed signal to the subcarriers of the allocated band; and an Inverse Fast Fourier Transform (IFFT) module for performing an IFFT processing on the signal allocated to the subcarriers and generating the SC-FDMA signal.

17. The apparatus as claimed in claim 16, further comprising a power controller for supplying power to a first path including the upsampler, the LPF, and the multiplier and for cutting off power supply to a second path including the DFT module, the subcarrier allocator, and the IFFT module when the Q is an integer, and for supplying power to the second path and for cutting off power supply to the first path when the Q is not an integer.

18. The apparatus as claimed in claim 12, wherein the allocated band comprises a resource configured according to an Interleaved FDMA (IFDMA) scheme, and further comprising:

a repeater for repeating the input signal Q times to expand the input signal Q times, wherein the multiplier multiplies the repeated signal by a linear phase according to a start offset of the allocated band and generates the SC-FDMA signal.

19. The apparatus as claimed in claim 18, further comprising an address controller for controlling an address of the input signal to be transmitted and inserting a Cyclic Prefix (CP) before the repeating of the input signal.

20. The apparatus as claimed in claim 18, further comprising a linear phase calculator for determining the linear phase, wherein the linear phase is determined by:

$$e^{j\frac{2\pi k_0}{N}n},$$

where "$k_0$" denotes the start offset of the allocated band, "N" denotes the number of subcarriers of the system band, and "n" denotes a time index.

21. The apparatus as claimed in claim 18, further comprising:

a Discrete Fourier Transform (DFT) module for performing a DFT processing on the input signal to be transmitted when the Q is not an integer;

a subcarrier allocator for allocating the DFT-processed signal to the subcarriers of the allocated band; and an Inverse Fast Fourier Transform (IFFT) module for performing an IFFT processing on the signal allocated to the subcarriers and generating the SC-FDMA signal.

22. The apparatus as claimed in claim 21, further comprising a power controller for supplying power to a first path including the repeater and the multiplier and for cutting off power supply to a second path including the DFT module, the subcarrier allocator, and the IFFT module when the Q is an integer, and for supplying power to the second path and for cutting off power supply to the first path when the Q is not an integer.

* * * * *